United States Patent
Krupenkin et al.

(10) Patent No.: US 9,203,291 B2
(45) Date of Patent: *Dec. 1, 2015

(54) METHOD AND APPARATUS FOR MECHANICAL ENERGY HARVESTING USING COMBINED MAGNETIC AND MICROFLUIDIC ENERGY GENERATION

(71) Applicants: Thomas Krupenkin, Madison, WI (US); Joseph Ashley Taylor, Madison, WI (US)

(72) Inventors: Thomas Krupenkin, Madison, WI (US); Joseph Ashley Taylor, Madison, WI (US)

(*) Notice: Subject to any disclaimer, the term of this patent is extended or adjusted under 35 U.S.C. 154(b) by 317 days.

This patent is subject to a terminal disclaimer.

(21) Appl. No.: 13/692,062

(22) Filed: Dec. 3, 2012

(65) Prior Publication Data

US 2013/0140917 A1    Jun. 6, 2013

Related U.S. Application Data

(60) Provisional application No. 61/566,603, filed on Dec. 3, 2011.

(51) Int. Cl.
    *F02B 63/04*         (2006.01)
    *H02K 44/00*       (2006.01)
    *H02N 3/00*         (2006.01)

(52) U.S. Cl.
    CPC . *H02K 44/00* (2013.01); *H02N 3/00* (2013.01)

(58) Field of Classification Search
    CPC ... Y10S 415/916; H02N 11/002; H02N 99/00
    USPC ....... 290/1 R; 310/11, 12.12, 309; 417/410.1, 417/92
See application file for complete search history.

(56) References Cited

U.S. PATENT DOCUMENTS

| | | | |
|---|---|---|---|
| 3,310,689 A * | 3/1967 | Heinmets | 310/306 |
| 3,634,704 A * | 1/1972 | Stix | 310/11 |
| 3,927,329 A * | 12/1975 | Fawcett et al. | 290/1 R |
| 4,126,822 A | 11/1978 | Wahlstrom | |
| 5,298,818 A * | 3/1994 | Tada | 310/11 |
| 7,105,935 B2 * | 9/2006 | Hsu | 290/2 |
| 7,467,928 B2 | 12/2008 | Fakunle et al. | |
| 7,872,851 B2 | 1/2011 | Lohndorf et al. | |
| 7,898,096 B1 * | 3/2011 | Krupenkin | 290/1 R |
| 7,989,197 B2 | 8/2011 | Yoo et al. | |
| 8,053,914 B1 | 11/2011 | Krupenkin | |
| 8,258,644 B2 | 9/2012 | Kaplan | |
| 2009/0283407 A1 * | 11/2009 | Shah et al. | 204/547 |

(Continued)

FOREIGN PATENT DOCUMENTS

| | | |
|---|---|---|
| KR | 10-2010-0110242 | 10/2010 |
| WO | 2009-157690 | 12/2009 |

(Continued)

*Primary Examiner* — Julio Gonzalez Ramirez
(74) *Attorney, Agent, or Firm* — Wendy W. Koba, Esq.

(57) ABSTRACT

An energy harvesting system for converting mechanical energy into electrical energy uses an electrostatic arrangement based upon the interaction between conductive microfluidic droplets and dielectric-coated electrodes in combination with an electromagnetic arrangement based upon the interaction between magnetic elements and coils, with the two arrangements disposed in an interleaved configuration that provides a degree of synergy to the overall system in the form of providing spacings between adjacent elements and providing a bias voltage source for the electrostatic arrangement from the energy created by the electromagnetic arrangement.

14 Claims, 9 Drawing Sheets

(56) References Cited

U.S. PATENT DOCUMENTS

| | | |
|---|---|---|
| 2011/0008767 A1 | 1/2011 | Durack |
| 2011/0037325 A1* | 2/2011 | Ciocanel et al. ............... 310/11 |
| 2011/0074162 A1 | 3/2011 | Cottone et al. |
| 2012/0091004 A1 | 4/2012 | Abell et al. |
| 2012/0292915 A1 | 11/2012 | Moon |
| 2014/0049049 A1* | 2/2014 | Krupenkin et al. ........... 290/1 A |

FOREIGN PATENT DOCUMENTS

| | | | |
|---|---|---|---|
| WO | 2011-102451 | | 8/2011 |
| WO | WO 2011/102451 | * | 8/2011 |

* cited by examiner

METHOD AND APPARATUS FOR MECHANICAL ENERGY HARVESTING USING COMBINED MAGNETIC AND MICROFLUIDIC ENERGY GENERATION

CROSS-REFERENCE TO RELATED APPLICATIONS

This application claims the benefit of U.S. Provisional Application No. 61/566,603, filed Dec. 3, 2011 and herein incorporated by reference.

TECHNICAL FIELD

The present invention relates to mechanical energy harvesting and, more particularly to a method and apparatus for energy harvesting that utilizes magnetic and microfluidic elements to create electrical energy from otherwise "wasted" mechanical movements.

BACKGROUND OF THE INVENTION

Currently, the majority of autonomous and mobile electronic systems are powered by electrochemical batteries. Although the quality of these batteries has substantially improved over the last two decades, their energy density has not greatly increased. At present, limitations such as cost, weight, limited service time and waste disposal problems intrinsic to the materials used to form electrochemical batteries are impeding the advance of many areas of electronics. The problem is particularly acute in the area of mobile electronic devices, where rapidly-growing performance and sophistication of these devices leads to ever-increasing power demands—demands that cannot easily be met by traditional electrochemical batteries.

One of the technologies that holds great promise to substantially alleviate the current reliance on electrochemical batteries is high-power energy harvesting. The concept of energy harvesting works toward developing self-powered devices that do not require replaceable power supplies. In cases where device mobility is required, and high power consumption is anticipated, harvesters that convert mechanical energy into electrical energy are particularly promising as they can tap into a variety of high-power-density sources, including mechanical vibrations.

High power harvesting of mechanical energy is a long-recognized concept that has not been significantly commercialized to date, based on the lack of a viable energy harvesting technology. Existing methods of mechanical-to-electrical energy conversion such as, for example, electromagnetic, piezoelectric or electrostatic do not allow for effective direct coupling to the majority of high power environmental mechanical energy sources. In particular, bulky and expensive mechanical or hydraulic transducers are required by each of these existing methods to convert the broad range of aperiodic forces and displacements typically encountered in nature into a form useable for conversion to electricity.

An alternative approach to energy harvesting has recently been proposed that substantially alleviates the above-mentioned problems, the new approach being the use of a microfluidics-based energy harvester. In particular, an exemplary high power microfluidics-based energy harvester is disclosed in U.S. Pat. No. 7,898 issued to T. N. Krupenkin on Mar. 2, 2011, as well as U.S. Pat. No. 8,053,914 issued to T. N Krupenkin on Nov. 8, 2011, both of which are herein incorporated by reference. An exemplary embodiment of an energy harvester as described in the above-referenced patents generates electrical energy through the interaction of thousands of microscopic liquid droplets with a network of thin-film electrodes. A typical configuration of the Krupenkin energy harvester is capable of generating several watts of power.

An exemplary embodiment of this energy harvester is shown in FIG. 1, which illustrates a train of energy-producing conductive droplets 1 located along a microscopically-thin channel 2, where droplets 1 are suspended within a liquid dielectric medium 3 and are hydraulically actuated by applying a pressure differential between the ends of channel 2. Pluralities of separate electrodes 4-1 and 4-2 are disposed along either side of channel 2, which interact with droplets 1 as they move back and forth within channel 2 during changes in pressure. As conductive droplets 1 move along channel 2, they create arrays of capacitors with electrodes 4-1 and 4-2, the capacitors changing in stored charge as the droplets move back and forth, generating an electrical current flow along conductors 5-1 and 5-2. This type of hydraulic activation method provides an important advantage as it allows for efficient direct coupling with a wide range of high power environmental mechanical energy sources, including human locomotion.

While considered a significant advance in the field of energy harvesting, the arrangement as shown in FIG. 1 requires the use of an external source of bias voltage to generate the charges at electrodes 4-1 and 4-2. This bias voltage can be provided by sources such as electrochemical batteries or electrical capacitors. The output power density provided by the harvester device increases rapidly with larger bias voltages. Indeed, certain power density requirements may necessitate relatively high bias voltages (e.g., on the order of tens or even hundreds of voltages). The need to provide a bias voltage source may introduce unwanted complications in the design of the harvesting device and adversely affect its reliability.

Thus, a need remains in the art for an arrangement that provides the advantages of the microfluidic energy harvesting configuration as developed by Krupenkin without requiring the use of an external bias voltage source.

SUMMARY OF THE INVENTION

The needs remaining in the art are addressed by the present invention, which relates to mechanical energy harvesting and, more particularly to a method and apparatus for energy harvesting that utilizes a combination of magnetic and microfluidic elements to create electrical energy from otherwise wasted mechanical movements.

In accordance with one embodiment of the present invention, an energy harvesting apparatus comprises a chain of energy-producing elements, alternating between a magnetic element and microfluidic droplets, the chain configured to laterally move within an energy-producing channel consisting of an alternating arrangement of coils (each coil having one or more turns) and dielectric-coated electrodes. The lateral movement is caused by a pressure differential between the opposite ends of the channel (for example, human locomotion). The presence of the magnetic elements moving within the turns of a coil produces the electromagnetic energy required to bias the electrodes of the capacitive structure created with the droplets, eliminating the need for an external bias voltage source.

Indeed, an exemplary embodiment of the present invention comprises apparatus for converting mechanical energy into electrical energy comprising a channel formed as a tube and comprising a plurality of coils and a plurality of dielectric-coated electrodes disposed within the tube in an interleaved configuration such a single dielectric-coated electrode is disposed between a pair of adjacent individual coils and a chain formed of alternating regions of magnetic material and microfluidic conductive droplets, the chain disposed along a hollow longitudinal area within the tube and capable of lateral movement within the hollow longitudinal area such that the application of mechanical energy to the apparatus in the form of movement of the chain with respect to the channel creates multiple alternations of an area of overlap between the regions of magnetic material and turns of the coil to create electromagnetic energy, and multiple alternations of an area of overlap between the microfluidic conductive droplets and the dielectric-coated electrodes to create electrostatic energy, the electrostatic energy created in the presence of a bias voltage.

Other and further embodiments of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

As described in detail below, an embodiment of the present invention comprises a synergistic combination of an electromagnetic energy generation arrangement and a microfluidic-based electrostatic energy generation arrangement, where the energy created by the electromagnetic portion of the system can be used to provide the bias voltage required for the electrostatic portion of the system. The incorporation of the electromagnetic elements allows for this embodiment of the energy harvesting system of the present invention to operate without the need for an external voltage bias source, as required in prior art arrangements.

Figure 1:
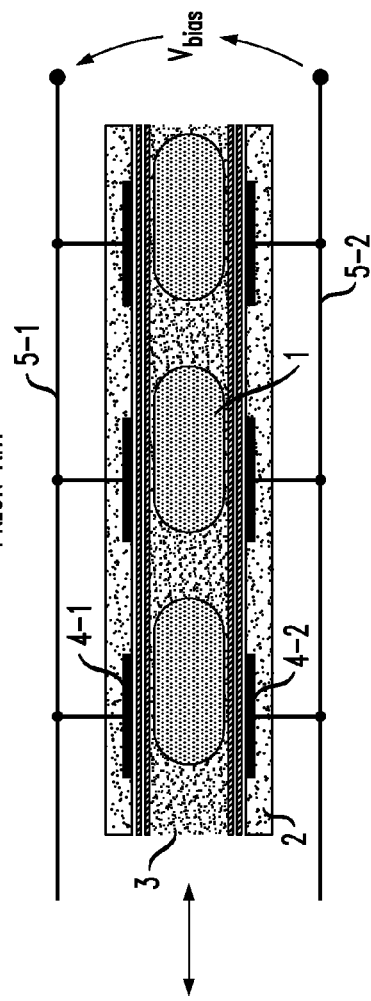
FIG. 1 illustrates a prior art microfluidic-based energy harvesting arrangement.
Figure 2:
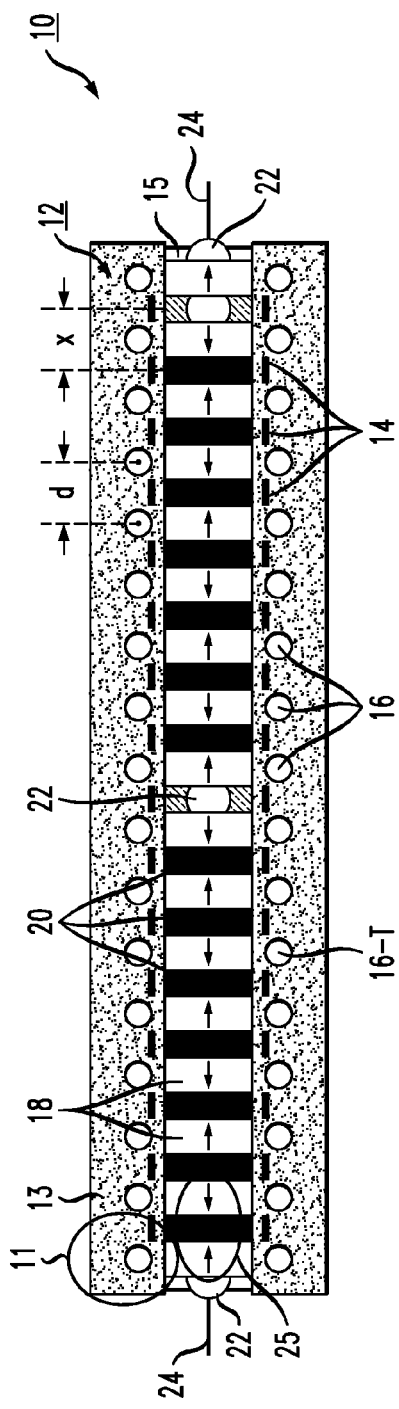
FIG. 2 is a cut-away side view of an exemplary electrostatic and electromagnetic energy harvesting arrangement formed in accordance with the present invention.
Figure 3:
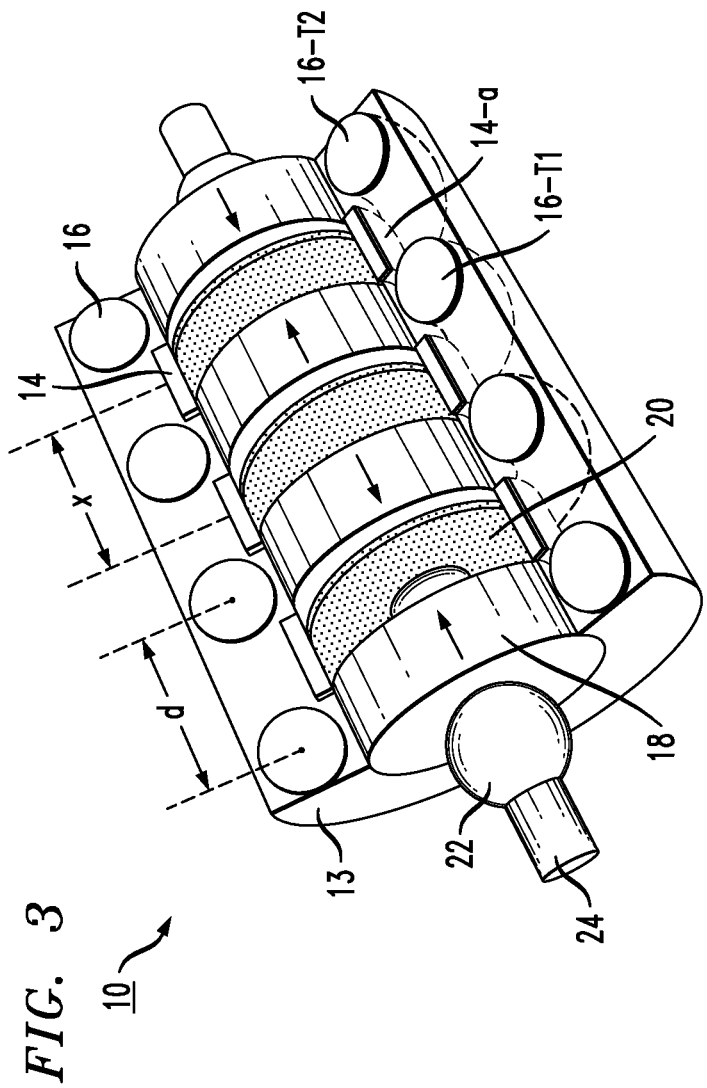
FIG. 3 is an isometric view of a portion of the arrangement of FIG. 2.

FIG. 2 is a cross-sectional view of an exemplary embodiment of the present invention, illustrating an energy harvesting system 10 utilizing a plurality of microfluidic conductive elements and a plurality of magnetic disks in an interdigitated arrangement that is capable of creating both microfluidic-based electrostatic energy and electromagnetic energy, respectively. FIG. 3 is an isometric view of a portion of the arrangement of FIG. 2.

As shown in this particular embodiment, energy harvesting system 10 includes a hollow tube 12, with a plurality of dielectric-coated electrodes 14 and a plurality of coils 16 embedded within the material 13 forming tube 12. It is an aspect of the present invention that electrodes 14 and coils 16 are disposed in an interleaved configuration within tube 12, with a single electrode 14-$a$ disposed between an adjacent pair of coils 16-T1 and 16-T2. The pitch of the plurality of coils 16, defined as the spacing d between the center of adjacent individual coils 16-T1 and 16-T2, is essentially constant in this particular configuration. Similarly, the spacing x between adjacent electrodes 14-$a$ and 14-$b$ is essentially constant. As a result, a well-controlled, known amount of energy can be reproducibly created with system 10. This combination of tube 12, electrodes 14 and coils 16 is referred to at times herein as a "channel" portion 11 of energy harvesting system 10.

Continuing with the description of the embodiment of FIG. 2, energy harvesting system 10 further comprises a plurality of magnetic rings 18 and a plurality of energy-producing droplets 20 disposed in an alternating configuration within the hollow inner region 15 of tube 12. Neighboring magnetic rings 18 are magnetized through their thickness in opposite polarities (as particularly shown by the arrows in FIGS. 2 and 3). An alloy of neodymium, iron and boron ($Nd_2Fe_{14}B$) is one exemplary material that may be used for magnetic rings 18.

Energy-producing conductive droplets 20 used to provide energy as the electrostatic portion of system 10 are disposed between neighboring magnetic rings 18, as shown in FIGS. 2-5. Examples of suitable electrically conductive liquids that may be used for droplets 20 include aqueous salt solutions and molten salts. Exemplary aqueous salt solutions include 0.01 molar solutions of salts such as $CuSO_4$, $LiCl$, $KNO_3$, or $NaCl$. Exemplary molten salts include 1-ethyl-3-methylimidazolium tetrafluoroborate and 1-ethyl-3-methylimidazolium trifluoromethanesulfonate, which are both commercially available. In other cases the conductive liquid can comprise liquid metals such as, gallium, indium or mercury, as well as their alloys.

In order to maintain a desired, fixed spacing between adjacent magnetic rings 18, a plurality of spacers 22 are included in system 10 as shown, where droplets 20 will fill the region surrounding spacers 22. The use of spacers is considered to be optional.

Figure 4:
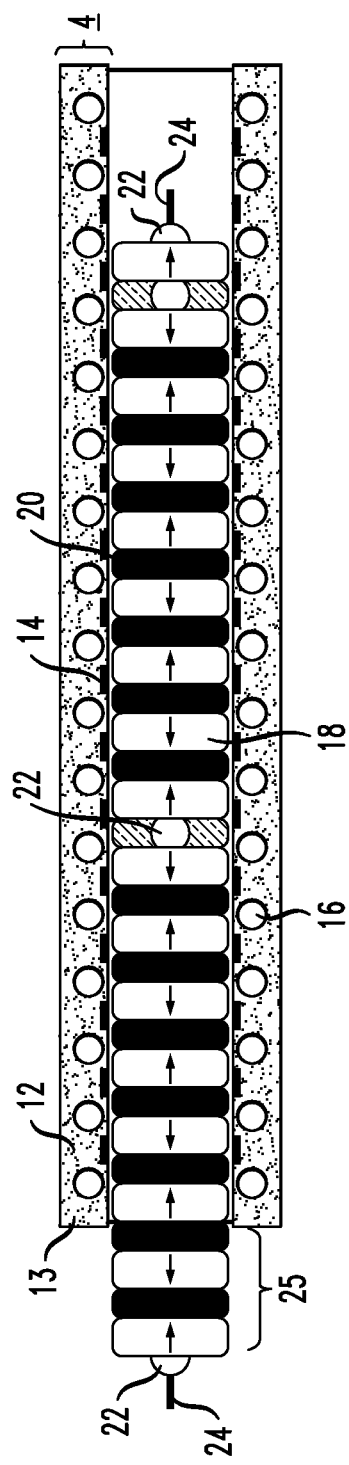
FIG. 4 is an alternative illustration of the embodiment of FIG. 2, in this case showing the relative movement of the energy-producing chain with respect to the energy-producing channel.

In accordance with this embodiment of the present invention, the plurality of magnetic rings 18, spacers 22 and droplets 20 are connected by a single, centrally disposed flexible rod (e.g., "string") 24, to form what is referred to at times hereinafter as an energy-producing "chain" 25. The various elements disposed along rod 24 are affixed thereto in a manner such that they are permitted to rotate about rod 24, but not slide along rod 24. As will be described in detail below, chain 25 is permitted to slide, as a single "fixed" unit, back and forth within channel 11, as indicated by the double-ended arrows. In accordance with the present invention, this movement will cause the creation of energy as magnetic rings 18 move within the plurality of coil 16 (creating electromagnetic energy) and droplets 20 move to overlap dielectric-coated electrodes 14 (creating electrostatic energy). FIG. 4 illustrates, in exaggerated form, the movement of chain 25 with respect to channel 11.

Figure 5:
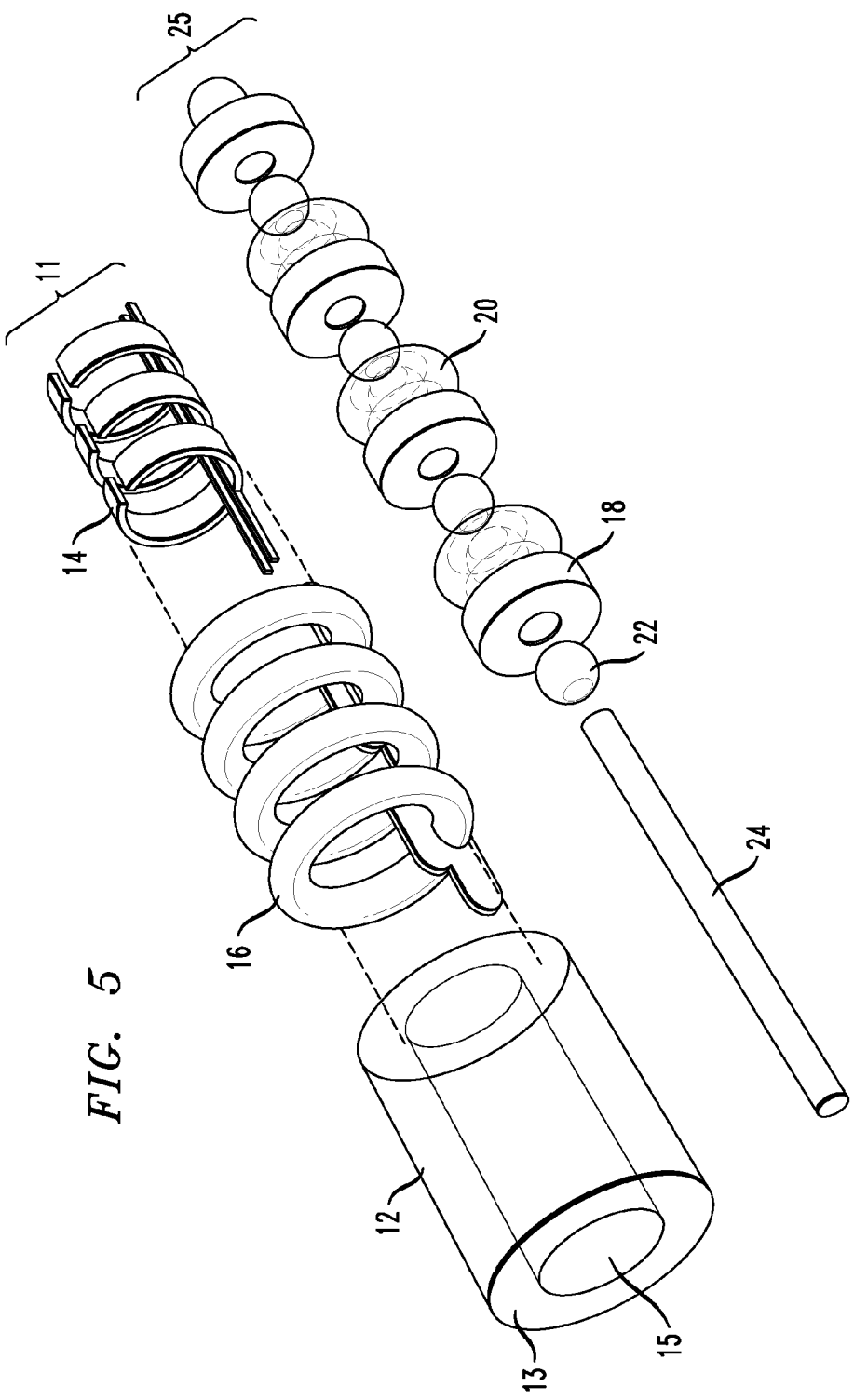
FIG. 5 is an exploded view of the embodiment of the present invention as shown in FIG. 2.

FIG. 5 is an exploded view of this embodiment of the present invention, showing the elements forming channel 11 as one grouping, and the elements forming chain 25 as a separate grouping. Channel 11 is particularly shown as comprising tube 12, formed of a material 13 such as, polyvinyl chloride (PVC), polypropylene or similar plastics, preferably forming a flexible tube. As shown tube 12 includes a central opening 15 of a diameter sufficient to allow for chain 25 to freely move laterally as a differential hydraulic pressure is applied to the ends of tube 12. Coils 16 and dielectric-coated electrodes 14 are shown as separate elements of the grouping forming channel 11 in this view. In a preferred embodiment, these elements are formed as embedded within material 13 of tube 12 (see FIG. 3). Alternatively, coils 16 and dielectric-coated electrodes 14 may be disposed over the elements forming chain 25 (e.g., disposed in a separate sleeve element covering chain 25), with tube 12 then disposed over the combination of chain 25, coils 16 and electrodes 14. Regardless of the implementation, it is an important aspect of the present invention that coils 16 and electrodes 14 be interposed such that an electrode is positioned between adjacent individual coils of the plurality of coils 16 (i.e., an interleaved configuration). This is evident in the views shown in FIGS. 2-4.

Continuing with the description of the exploded view of FIG. 5, the elements shown as forming chain 25 include the plurality of magnetic rings 18, the plurality of conductive droplets 20 and the plurality of spacers 22. The separate elements are disposed in an alternating arrangement, where it is to be understood that droplets 20 will fill the area outside of spacers 22 between adjacent magnetic rings 18 (as shown in FIGS. 2-4). Flexible rod (string) 24 is also shown, and as described above, is used as a central support member to hold magnetic rings 18 and spacers 22 is a fixed arrangement, eliminating the possibility of translational movement of these elements.

In order to understand the details of the present invention, it is considered important to also understanding of the underlying principles of electrostatic energy harvesting from the basic microfluidic structure, as well as the principles of electromagnetic energy harvesting from the basic magnetic structure. Microfluidics is a branch of micro-fabrication which is concerned with developing means of handling small volumes of liquids. An aspect of the present invention is to utilize fluidic structures consisting of a large number of microscopic volumes of liquids (e.g., volumes from picoliters to microliters) as a working element in a mechanical-to-electrical energy conversion system. The large number of these microscopic elements (on the order of hundreds or even thousands) yields a realistic amount of electrical energy that can be generated from a relatively small volume of mechanical motion.

Indeed, the maximum electrical energy output that can be produced by the microfluidic-based portion of the energy harvesting system of the present invention is directly proportional to the variation of the electrostatic field energy during the change in size of contact area between the droplets within the chain and the overlying electrodes along the channel, as mentioned above. For the simplest case where the structure has a total capacitance of C and is maintained at a given electrical voltage differential V, the electrostatic field energy $E_0$ is expressed as $E_0 = 0.5\, CV^2$. Here, $E_0$ is the energy measured in Joules, V is measured in volts, and C is the capacitance measured in Farads. As will be described hereinbelow, the voltage differential is supplied in accordance with various embodiments of the present invention by the electromagnetic portion of the energy harvesting system.

Figure 6:
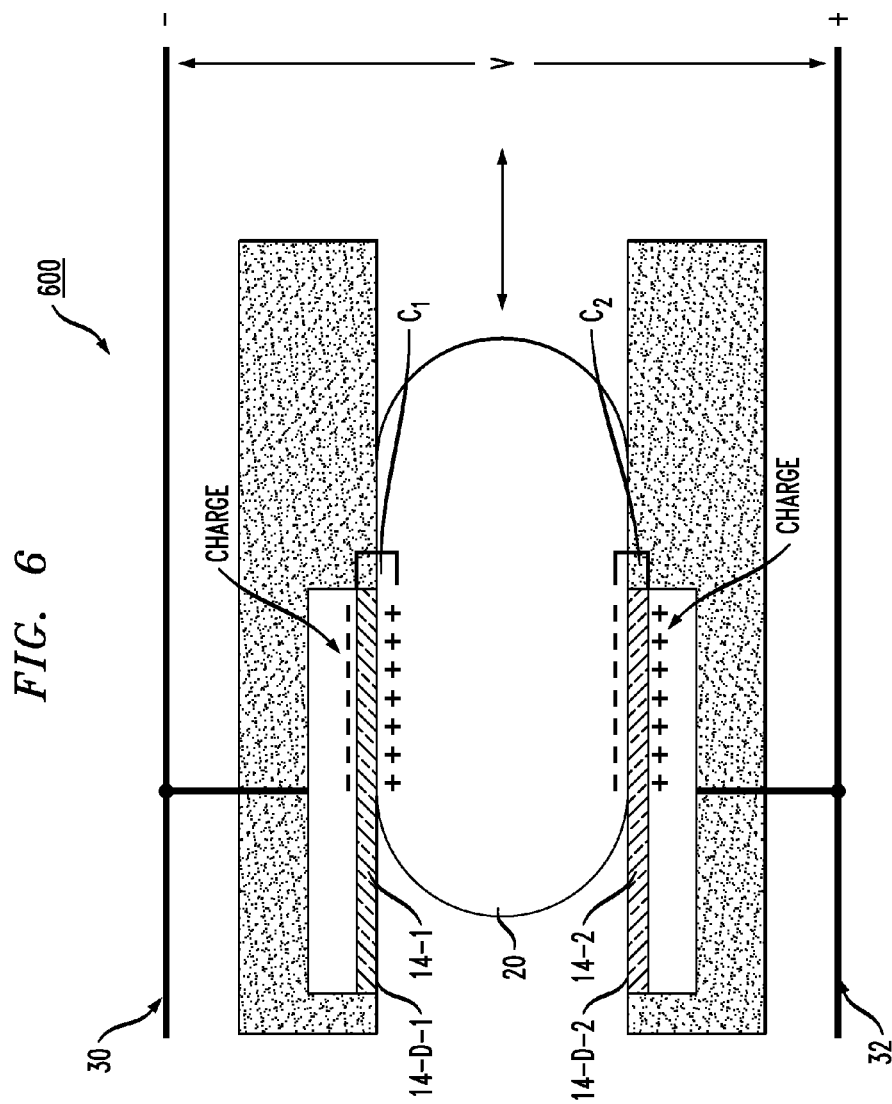
FIG. 6 is an enlarged view of a selected segment of the embodiment of FIG. 2, in this case illustrating the relationship between a single conductive microfluidic droplet and a pair of dielectric-coated electrodes as used to create electrostatic energy in accordance with the present invention.

An operating principle of the microfluidic-based aspect of the present invention can be understood with reference to a simplified embodiment, as illustrated in FIG. 6, which presents a close-up cross-sectional view of a short segment 600 of system 10, showing only a single conductive droplet 20. FIG. 6 also illustrates a pair of dielectric-coated electrodes 14-1 and 14-2 which, together with conductive droplet 20, forms two substantially planar electrical capacitors $C_1$ and $C_2$. In this embodiment, the dielectric coating portion 14-D serves as the spacer in each capacitor structure between conductive droplet 20 and the inner conductive portion 14-C of each electrode. The first capacitor $C_1$ is formed by droplet 20 and dielectric-coated electrode 14-1 (with dielectric 14-D-1 being the spacer). The second capacitor $C_2$ is formed by conductive droplet 20 and dielectric-coated electrode 14-2 (similarly, dielectric 14-D-2 forming the spacer between the conductive surfaces in the capacitor structure).

As shown, charges accumulate at the conductive elements of capacitors $C_1$ and $C_2$ in the area of the interfaces with the interposed dielectric. Since droplet 20 is conductive, capacitors $C_1$ and $C_2$ are substantially equal and electrically connected in series. Hence, their total capacitance $C_{tot}$ is one half of their respective individual capacitance. The actual value of capacitance $C_{tot}$ associated with electrodes 14-1 and 14-2 depends on the relative position of droplet 20 with respect to electrodes 14-1 and 14-2. In particular, when droplet 20 is aligned with electrodes 14-1 and 14-2 such as to maximize the area of overlap, the capacitance reaches its maximum value. When droplet 20 slides away from electrodes 14-1 and 14-2 and is positioned in between the neighboring electrodes (that is, positioned underneath coil 16 as chain 25 moves, as shown in FIG. 4), no overlap is present and the capacitance approaches zero.

Quite obviously, the same evolution of capacitance occurs at each pair of opposing dielectric-coated electrodes 14 within tube 12 (see FIG. 2). Since all these pairs of electrodes are connected in parallel, one can treat the entire set of electrodes as electrically coupled between a pair of conductors 30 and 32 as one variable capacitor with the total capacitance $C_{tot}$ equal to $NC_{tot}$, where N is a number of electrode pairs embedded within tube 12. The movement of droplets 20 through channel 11 causes multiple variations of the total capacitance C between zero and some maximum value $C_{max}$.

In contrast to prior art arrangements that utilized an external voltage source to provide a bias between conductors 30 and 32, and transfer electrical current generated in response to multiple alternations in total electrical capacitance $C_{tot}$ to a power consumption means (not shown), this embodiment of the present invention utilizes the electromagnetic portion of system 10 to supply this bias voltage.

Advantageously, the interdigitated arrangement of the electromagnetic portion of system 10 with the microfluidic-based electrostatic portion will automatically move the bias voltage through the range of zero to $V_{max}$ each time the total capacitance $C_{tot}$ reaches its maximum value $C_{max}$, i.e. when the plurality of conductive droplets 20 are aligned with their dielectric-coated electrodes 14 and magnetic rings 18 are aligned with coils 16. The creation of this bias voltage, in association with the operation of Faraday's Law, is explained hereinbelow. For now, it is useful to understand that the bias voltage supplied by the electromagnetic portion of system 10 will increase as the total capacitance $C_{tot}$ increases by virtue of the interdigitated arrangement of the energy-producing elements within system 10. Thus, as the total capacitance $C_{tot}$ starts to decrease again (i.e., as chain 25 continues to slide within channel 10), the bias voltage will move back to zero.

The above-described microfluidic-based portion of energy harvesting system 10 can be configured to provide a very high level of tunability with respect to coupling to environmental motion characterized by various levels of force and displacement. For example, by increasing the length of tube 12, while preserving the size of individual droplets 20, one can adjust the amount of displacement that can be handled by system 10, without affecting the force acting on the droplets. At the same time, by increasing the total area covered by electrodes, one can adjust the level of force that can be successfully coupled to system 10, without affecting the level of possible displacements.

It is also be understood that there are a number of methods that can be used to extract electrical energy from a variable capacitor with a periodically alternating capacitance value and that can be adapted for use with the present invention. Some of those methods are disclosed in U.S. Pat. Nos. 6,936,994; 4,127,804; 6,127,812; 3,094,653; 3,013,201; 4,054,826; 6,750,590; 4,897,592; 4,126,822; 2,567,373; 3,405,334; 6,255,758; 7,112,911; 4,595,852 and 4,814,657, all of which are incorporated by reference herein in their entirety.

Figure 7:
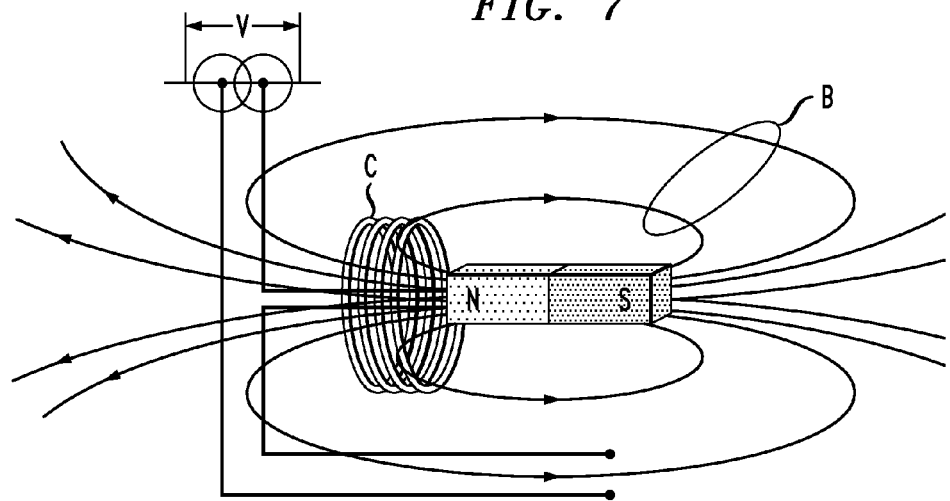
FIG. 7 illustrates an exemplary configuration for creating electromagnetic energy utilizing a moving magnet in accordance with Faraday's Law.

Similarly, it is important to understand the concepts behind the generation of energy from the electromagnetic portion of energy system 10 of the present invention as illustrated in the embodiment of FIG. 2. FIG. 7 illustrates well-known principles of Faraday's Law as applied to this aspect of the present invention. In its most general form, Faraday's Law can be defined as follows: any change in the magnetic field distribution within a coil of wire will induce a current to flow through the wire, thus creating a bias voltage between the terminations of the coil. FIG. 7 shows a simple magnet M approaching a wire coil C, with the magnetic field lines (flux) shown. The magnetic field lines that pass through the coil create this voltage, $V=Md(BA)/dt$, where B is defined as the magnetic flux density, A is the area of the coil, M is the number of turns in the coil, t is the parameter of time and $d(\ )/dt$ denotes the derivative with respect to time. Thus, a moving magnet, as a function of time, will produce a voltage that changes as a function of time as well.

Figure 8:
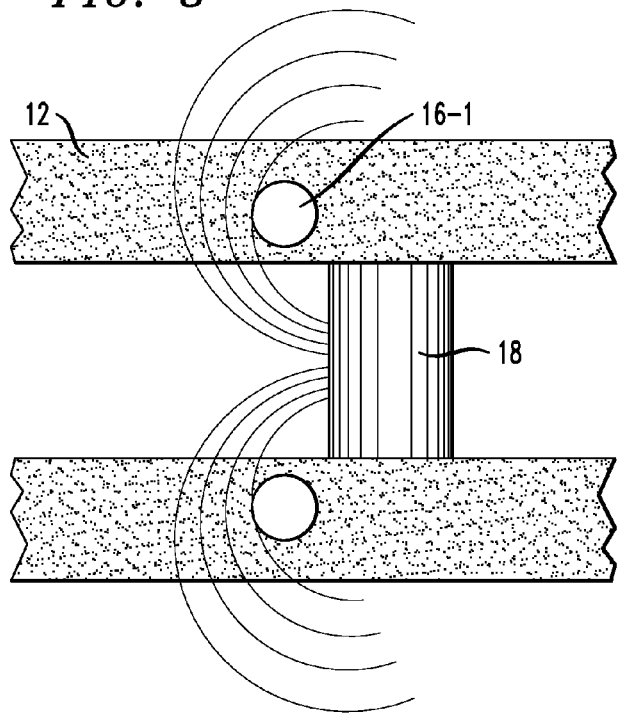
FIG. 8 is an enlarged view of a selected segment of the embodiment of FIG. 2, in this case illustrating the relationship between a single magnetic element and surrounding turn of a coil as used to create electromagnetic energy in accordance with the present invention.

FIG. 8 illustrates a small section of energy harvesting system 10, showing a single magnetic ring 18 as it approaches a specific coil 16-1 of the plurality of coils 16. As with the electrostatic aspect described above, as magnetic ring 18 approaches coil 16-1, the coupling therebetween will increase, thus generating a positive voltage that is created by the plurality of coils 16. Similarly, as magnetic ring 18 moves away from the plurality of coils 16 (and is instead passing through a pair of dielectric-coated electrodes 14), the field coupling will also decrease, generating a bias voltage of the opposite polarity. Thus, as the plurality of magnetic rings 18 slide back and forth within tube 12, the cumulatively-created bias voltage will continuously alternative polarities between positive and negative values as the magnetic field coupling to the plurality of coils 16 changes.

Applying these principles to the arrangement of FIG. 2, therefore, as chain 25 slides back and forth within channel 11, an electrostatic energy harvesting arrangement is formed by the plurality of variable capacitors created from the combination of droplets 20 with dielectric-coated electrodes 14, and an electromagnetic energy harvesting arrangement is formed by the plurality of variable voltage sources created from the combination of magnetic rings 18 with the plurality of coils 16. These variable energy-producing elements are constantly changing in value, increasing and decreasing, creating electrical energy that may be used to drive a load (not shown).

Inasmuch as the movement of chain 25 with respect to channel 11 can be provided by human locomotion or other types of conventional mechanical movements, the arrangement of FIG. 2 can advantageously be used in specific circumstances to provide needed energy to mobile electronic devices by harvesting this otherwise wasted mechanical movement. The particular interdigitated arrangement as shown in FIG. 2 results in a relatively compact configuration that exhibits synergistic properties in terms of the magnetic portion of the arrangement providing the bias voltage necessary for the microfluidic-based portion of the arrangement. Further each portion serves as a "spacer" element for the other portion, allowing for a plurality of separate segments to be formed along the lateral extent of the arrangement.

It is to be understood that in an alternative configuration of the embodiment of FIG. 2, the energy produced by the electromagnetic portion of energy harvesting system 10 can be independently utilized (at least partially, or perhaps fully) to power an electric load (i.e., a device such as a mobile telephone or the like). In the case where the electromagnetic portion of energy harvesting system 10 is fully utilized to power an electric load, the bias voltage required for energy generation by the electrostatic portion of system 10 can be supplied by an external source, as used in prior art arrangements. The flexibility in configuring this hybrid arrangement of energy harvesting system 10 to include both an electromagnetic portion and an electrostatic portion thus allows the user to tailor the arrangement as best-suited for a particular purpose.

Figure 9:
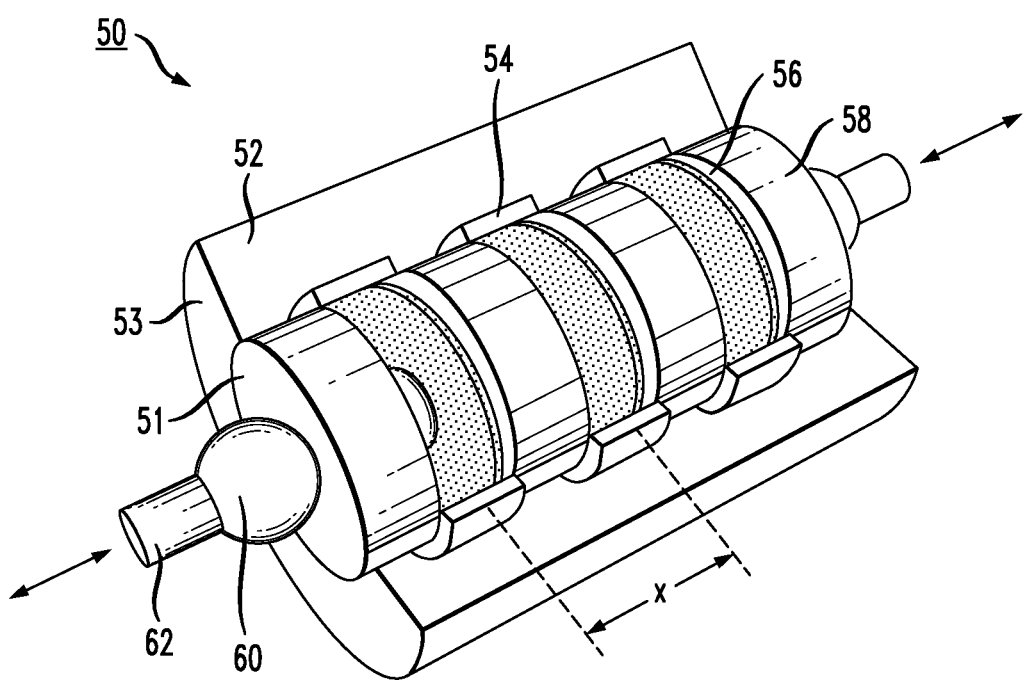
FIG. 9 is an isometric view of a portion of an alternative embodiment of the present invention, in this case formed to create only electrostatic energy.

Moreover, it is contemplated that the configuration as shown in FIGS. 2-4 may be simplified to create either an electrostatic-only embodiment or an electromagnetic-only embodiment. FIG. 9 illustrates an exemplary microfluidic energy harvesting system 50 formed in accordance with the present invention as an electrostatic-only arrangement. In this embodiment, system 50 comprises a tube 52, with a plurality of dielectric-coated electrodes 54 embedded within the material 53 forming tube 52, as shown. In order to minimize the spacing between the electrodes forming the capacitive structure, it is preferred to locate electrodes 54 as close to the inner surface 51 of tube 52 as possible. This combination may be defined as a "channel" 53 of the embodiment.

As with the above-described embodiment, system 50 utilizes a plurality of conductive droplets 56 that will form pairs of parallel capacitors with the plurality of dielectric-coated electrodes 54, creating an energy-producing variable capacitance as the overlap between droplets 56 and electrodes 54 changes. When a pressure differential is created on opposite ends of tube 52 (i.e., during mechanical movement of tube 52), the overlap between droplets 56 and electrodes 54 will change as droplets 56 slide back and forth (as a chain 55) within the opening of tube 52. A plurality of spacer rings 58 are shown as used in this embodiment to provide physical separation between adjacent droplets 56. Inasmuch as this is an electrostatic-only configuration, spacer rings 58 do not have to be magnetic; any material of suitable mechanical strength and rigidity can be used.

System 50 further comprises a plurality of spherical spacers 60, as shown, which are affixed to a flexible rod 62 in the same manner as the embodiment described above, with a spherical spacer 60 disposed between adjacent spacer rings 58. Again, the fluid of droplet 56 will naturally fill the region surrounding spherical spacer 60. Although not specifically shown in this illustration, it is to be understood that an external bias voltage source is necessary to charge the electrode portions (within the dielectric coating material) to form the capacitive energy storage ability of the arrangement.

Figure 10:
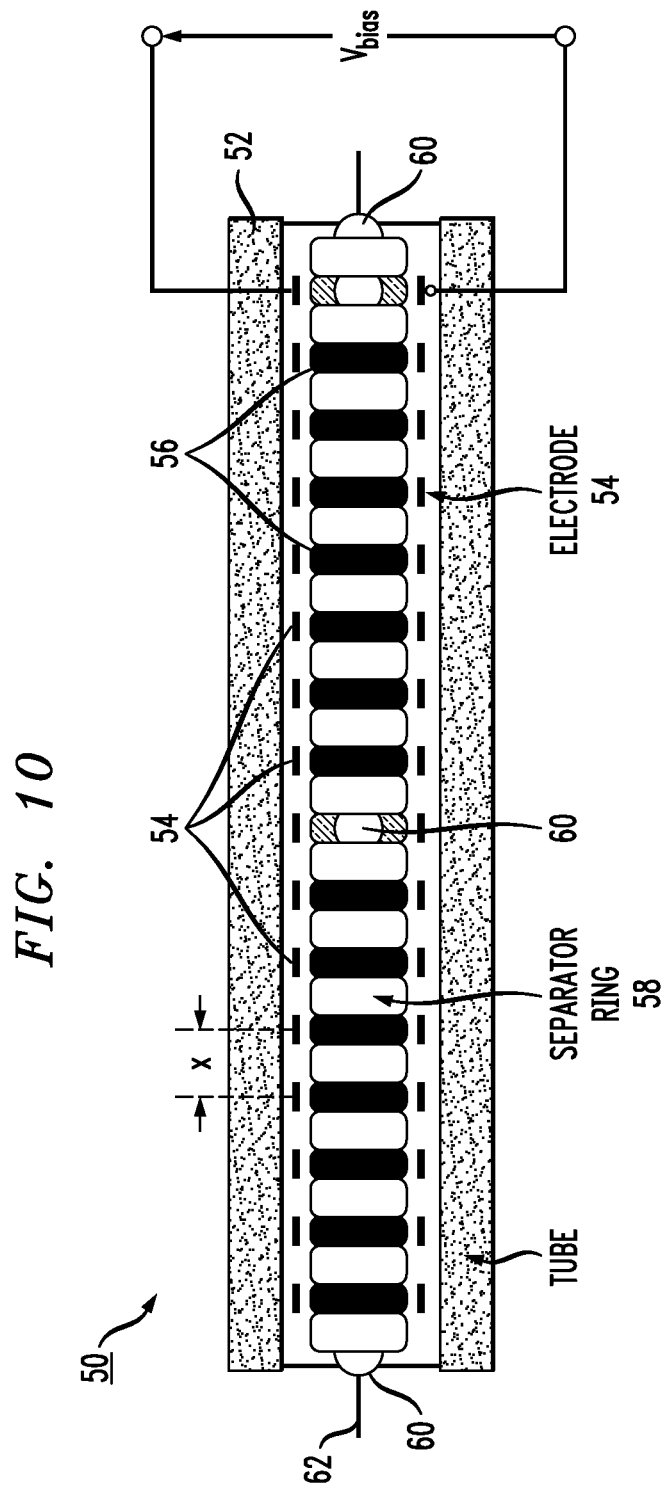
FIG. 10 is a cut-away side view of the embodiment of FIG. 9.

FIG. 10 is a cut-away side view of system 50 of FIG. 9, used as an electrostatic energy-only embodiment. As shown in this view, a separate voltage source 64 is used to provide a bias voltage across the plurality of electrodes 54 as disposed on opposing sides of conductive microfluidic droplets 56. While the electrodes are shown as separate conductive plates in this particular view, it is to be understood that this is a function of this view and in actual formation the plurality of electrodes 54 are configured as shown in the exploded view of FIG. 5. Additionally, tube 52 is shown in this particular embodiment as being separated from electrodes 54. However, this is for the purposes of illustration and it is to be understood that in a preferred embodiment, electrodes 54 are embedded within the material forming tube 52.

Indeed, if it a particular embodiment tube 52 is formed of a dielectric material, electrodes 54 may comprise a metal without any additional coating. In this case, it is advised that electrodes 54 be disposed as close as possible to the inner edge of tube 52, in order to form as small a dielectric gap as possible (the smaller gap creating a larger charge). The relative positioning of spacer rings 58 and spherical spacers 60 is clearly shown in this view.

Figure 11:
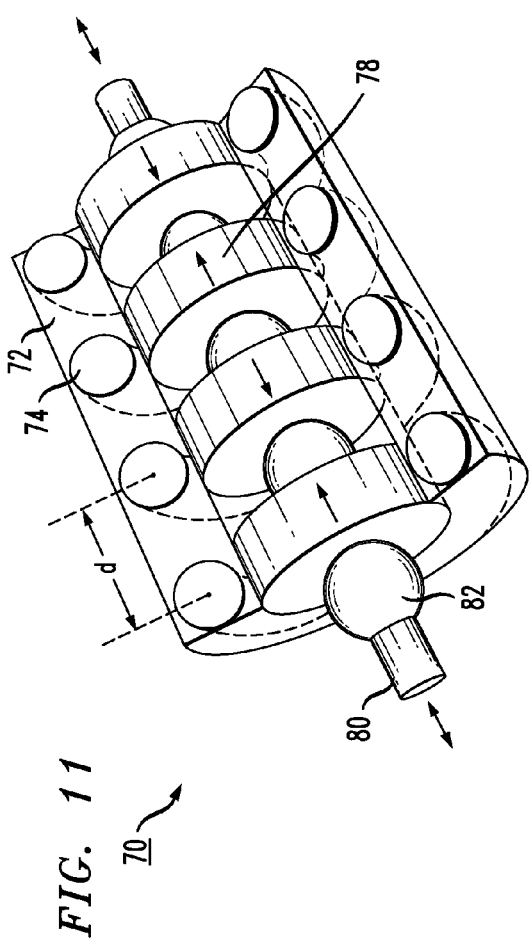
FIG. 11 is an isometric view of a portion of yet another embodiment of the present invention, in this case formed to create only electromagnetic energy.

A configuration of an electromagnetic-only energy harvesting system 70 is shown in FIG. 11, which utilizes the principles of Faraday's Law to create (induce) a voltage as a plurality of magnetic elements move through a coil. Referring to FIG. 11, system 70 is shown as comprising a tube 72 within which a plurality of coils 74 is embedded, where the plurality of coils 74 is defined as having a plurality of separate coils, each with one or more turns, with a spacing of d between the centers of adjacent coils, as shown. Thus structure thus forms a "channel" 71 of the system.

A plurality of magnetic rings 78 is disposed to pass along the central opening of tube 72, where rings 78 are inserted over a flexible rod 80 that is used to control the lateral motion of disks 78 back and forth within tube 72, forming a chain 73 which is free to slide within channel 71. As with the embodiments discussed above, magnetic rings are ordered such that adjacent elements are of opposite polarity (indicated by the arrows in FIGS. 11 and 12). In order to maintain a consistent spacing between adjacent magnetic rings 78 (and thus control the generation of the voltage across the plurality of coils 74), a plurality of spherical spacers 82 are disposed between disks 78, as shown.

Figure 12:
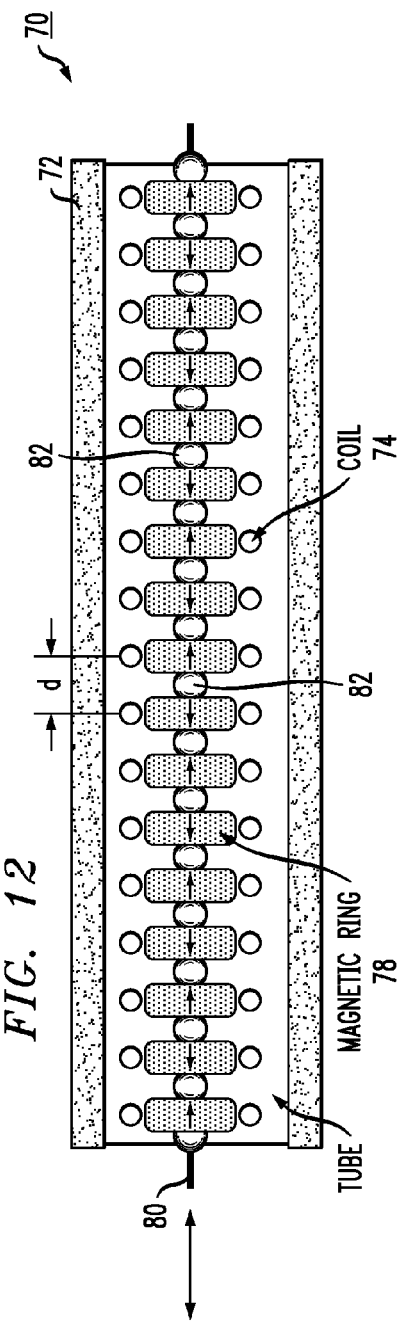
FIG. 12 is a cut-away side view of the embodiment of FIG. 11.

FIG. 12 is a cut-away side view of system 70, clearly showing the positioning of spherical spacers 82 between adjacent magnetic rings 78. The spacing d between adjacent coils of the plurality of coils 74 is also shown. While tube 72 is shown as separated from the plurality of coils 74, this is again to be considered as for the purposes of clarity; in many arrangements, the plurality of coils 74 may be embedded within the material forming tube 72. In operation of this embodiment, the act of imparting a hydraulic motion at either end termination of tube 72 will cause the plurality of magnetic rings 78 will slide through the center of coil 74, creating a voltage in accordance with the principles of Faraday's Law as discussed above.

Although the present invention has been described in detail, those of ordinary skill in the art should understand that they could make various changes, substitutions and alterations herein without departing from the scope of the invention.

What is claimed is:

1. An apparatus for converting mechanical energy into electrical energy comprising
   a channel formed as a tube and comprising a plurality of coils and a plurality of dielectric-coated electrodes disposed within the tube in an interleaved configuration such a single dielectric-coated electrode is disposed between a pair of adjacent coils of the plurality of coils; and
   a chain formed of alternating regions of magnetic material and microfluidic conductive droplets, the chain disposed along a hollow longitudinal area within the tube and capable of lateral movement within the hollow longitudinal area such that the application of mechanical energy to the apparatus in the form of movement of the chain with respect to the channel creates multiple alternations of an area of overlap between the regions of magnetic material and coils to create electromagnetic energy, and multiple alternations of an area of overlap between the microfluidic conductive droplets and the dielectric-coated electrodes to create electrostatic energy, the electrostatic energy created in the presence of a bias voltage applied across opposing electrodes within the plurality of dielectric-coated electrodes.

2. An apparatus as defined in claim 1 wherein neighboring regions of magnetic material are configured to be magnetized with an opposite polarity.

3. An apparatus as defined in claim 1 wherein the apparatus further comprises
   a plurality of spacers disposed between neighboring regions of magnetic material so as to maintain a defined spacing along the chain between neighboring regions of magnetic material, the spacers sized such that the microfluidic conductive droplets fill remaining voids between the neighboring regions of magnetic material.

4. An apparatus as defined in claim 1 wherein the electromagnetic energy created by the multiple alternations of the area of overlap between the regions of magnetic material and individual coils are used to generate a bias voltage for the dielectric-coated electrodes in the creation of electrostatic energy.

5. An apparatus as defined in claim 1 wherein the electromagnetic energy created by the multiple alternations of the area of overlap between the regions of magnetic material and individual coils is partially used to drive an external load, and partially used to generate a bias voltage for the dielectric-coated electrodes in the creation of electrostatic energy.

6. An apparatus as defined in claim 1 wherein the electromagnetic energy created by the multiple alternations of the area of overlap between the regions of magnetic material and individual coils are used to drive an external load, and an external voltage source is used to provide a bias voltage to the dielectric-coated electrodes for the creation of electrostatic energy.

7. An apparatus as defined in claim 1 wherein the tube comprises a material with a substantial degree of mechanical flexibility.

8. An apparatus as defined in claim 7 wherein the apparatus further comprises
   a flexible rod disposed along the longitudinal axis of the chain, where the plurality of magnetic elements is affixed to the flexible rod to prevent translation of the magnetic elements along the flexible rod, the application of mechanical energy to the apparatus causing the flexible rod to move along the longitudinal axis of the apparatus and slide the position of the chain with respect to the channel.

9. An apparatus as defined in claim 8 wherein the apparatus further comprises
a plurality of spacers disposed in an interleaved configuration with the plurality of magnetic elements, the plurality of spacers affixed to the flexible rod to prevent translation of the spacers along the flexible rod.

10. An apparatus as defined in claim 1 wherein the apparatus further comprises
a flexible rod disposed along the longitudinal axis of the chain, wherein the plurality of magnetic elements is affixed to the flexible rod to prevent translation of the magnetic elements along the flexible rod, the application of mechanical energy to the apparatus causing the flexible rod to move along the axis of the apparatus and slide the position of the chain with respect to the channel.

11. An apparatus as defined in claim 10 wherein the apparatus further comprises a plurality of spacers disposed in an interleaved configuration with the plurality of magnetic elements, the plurality of spacers affixed to the flexible rod to prevent translation of the spacers along the flexible rod.

12. A method of converting mechanical energy into electrical energy comprising:
providing a chain of energy-producing elements in the form of magnetic elements and microfluidic droplets disposed in an alternating arrangement;
providing a channel of energy-producing elements in the form of a plurality of coils and a plurality of dielectric-coated electrodes, the channel configured such that a single dielectric-coated electrode is positioned between adjacent coils of the plurality of coils;
inserting the chain through a central opening in the channel; and
translating the position of the chain with respect to the channel such that electromagnetic energy is created when the magnetic elements align and misalign with the individual coils of the plurality of the coils and electrostatic energy is created when the microfluidic droplets align and misalign with the plurality of dielectric-coated electrodes in the presence of a bias voltage across opposing electrodes.

13. The method as defined in claim 12 wherein the method further comprises the step of
utilizing the created electromagnetic energy as the bias voltage for the generation of electrostatic energy.

14. The method as defined in claim 12 wherein the generated electrostatic energy is used to provide electrical energy to a first load and the generated electromagnetic energy is used to provide electrical energy to a second load.

* * * * *